March 15, 1927.
J. C. SCHULTE
1,620,786
FARM GATE
Filed July 23, 1925
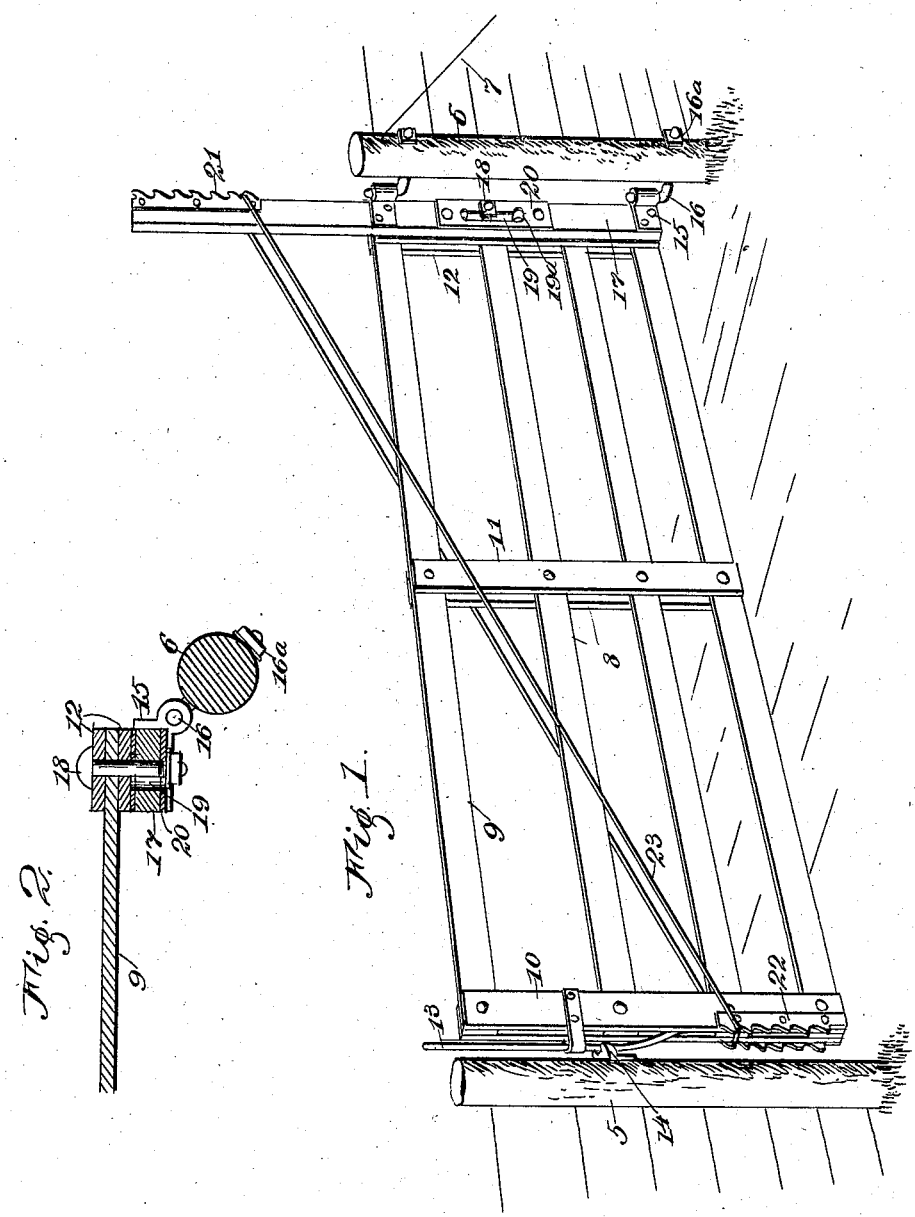
Inventor
John C. Schulte
By J. M. St. John
Attorney Patented Mar. 15, 1927.

1,620,786

UNITED STATES PATENT OFFICE.

JOHN C. SCHULTE, OF NORWAY, IOWA.

FARM GATE.

Application filed July 23, 1925. Serial No. 45,624.

This invention relates to long gates used for fields and lanes, and the object of the invention is to provide a gate which may be esaily adjusted and leveled as the supporting hinged-post sags, and in extraordinary cases, as when the way is obstructed by snow-drifts, may be tilted to any desired height for vehicles to pass through.

The invention is fully disclosed in the description and claims following, reference being had to the accompanying drawing, in which:

Fig. 1 is a view in perspective of a gate embodying my invention. Fig. 2 is a fragmentary sectional detail, showing the double pivoting of the gate and the manner of hinging the same to a post.

In the drawing, the numeral 5 denotes the latch-post and 6 the hinge-post for a gate of the type above mentioned. It is common to reinforce the hinge-post by means of a guy-wire 7, or the like, but even with the best possible anchorage the post is almost sure to sag under the weight of the gate. This calls for a resetting of the post, or some adjustment of the gate to prevent its scraping on the ground. The purpose of this invention is to provide for such an adjustment of the gate, and in a very simple manner.

The gate itself, 8, is herein shown as of a conventional wood frame type, with horizontal bars 9 and vertical cross-bars 10, 11 and 12. The bars 10 carry the latch 13, of a well known type, engaging a latch-plate 14 attached to the post. The gate is mounted to swing in either direction, and for that purpose has a special mounting, to be described presently.

The gate is provided with hinges 15 carried by hinge-pins 16 secured to the post, as by nuts 16ª. The hinges, that is to say, the female members of the hinges, are not attached to the main frame of the gate, but to a supplemental post 17. The gate in turn is hinged to this by a centrally disposed pivot-bolt 18 passing through both the post 17 and the end-bar 12. The gate may thus turn on this post, and parallel therewith. In order that the gate at this end may be raised and lowered the post is slotted at 19, and the slot provided with lateral recesses 19ª to partially admit the bolt, so that it does not slip. The proper strength and durability of this part of the gate is secured by providing steel cheek-plates 20, suitably slotted and notched, to reinforce the post 17.

The upper end of the post 17 is provided with serrated plates 21, and corresponding plates 22 are attached to the lower corner of the gate at the free end. These plates are adapted to hold the ends of a looped guy-wire 23 straddling the gate, by which means the free end of the gate may be raised or lowered as conditions require. When the gate is so obstructed by snow that this raising of it is insufficient, the whole gate may be up-ended to a vertical position to make a passageway through.

The gate is necessarily offset laterally from the hinge-post, and to make it possible to swing it to a right angle in either direction the hinge-pins are set diagonally, as shown in Fig. 2.

It is contemplated that a steel-framed gate may be mounted in the manner above described, but the special construction of the gate proper may be of any type adapted for co-operation with the novel structures above described.

Having thus described my invention, I claim:

In combination with a gate and its supporting hinge-post, a supplemental post carrying the gate hinges, a pivot-bolt connecting said supplemental post with one end of the gate, slotted and recessed cheek-plates to receive the pivot-bolt, and a looped guy engaging the upper end of the supplemental post and the lower part of the free end of the gate, with means for holding the ends of said guy in adjusted positions.

In testimony whereof I affix my signature.

JOHN C. SCHULTE.